United States Patent
Woo (10) Patent No.: US 10,827,131 B2
(45) Date of Patent: Nov. 3, 2020

(54) DISPLAY APPARATUS AND CONTROL METHOD THEREOF

(71) Applicant: SAMSUNG ELECTRONICS CO., LTD., Suwon-si (KR)

(72) Inventor: Jun-hee Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/916,633

(22) Filed: Mar. 9, 2018

(65) Prior Publication Data

US 2018/0262672 A1    Sep. 13, 2018

(30) Foreign Application Priority Data

Mar. 9, 2017    (KR) .................. 10-2017-0029866

(51) Int. Cl.
*G09G 5/02* (2006.01)
*H04N 5/235* (2006.01)
(Continued)

(52) U.S. Cl.
CPC ............ *H04N 5/2355* (2013.01); *G09G 5/02* (2013.01); *H04N 19/30* (2014.11);
(Continued)

(58) Field of Classification Search
CPC ....... G09G 2360/16; G09G 2320/0271; G09G 2320/0673; G09G 2320/0613;
(Continued)

(56) References Cited

U.S. PATENT DOCUMENTS 9,762,843 B2    9/2017    Terada et al.
9,973,724 B2    5/2018    Terada et al.
(Continued)

FOREIGN PATENT DOCUMENTS

EP    3035678 A1    6/2016
EP    3051486 A1    8/2016
(Continued)

OTHER PUBLICATIONS

International Search Report (PCT/ISA/210) dated Jun. 25, 2018 issued by the International Searching Authority in International Application No. PCT/KR2018/002814.
(Continued)

*Primary Examiner* — Hau H Nguyen
(74) *Attorney, Agent, or Firm* — Sughrue Mion, PLLC (57) ABSTRACT

A display apparatus may include a display, a storage configured to store a first output setting value corresponding to high dynamic range (HDR) content and a second output setting value corresponding to standard dynamic range (SDR) content, a communicator, and a processor configured to, while a first content is streamed through the communicator and displayed based on one of the first output setting value and the second output setting value that corresponds to the first content and in response to a second content being streamed through the communicator, control the display to change one of the first output setting value and the second output setting value to the other in phases and display the second content, and the first content may be one of the HDR content and the SDR content, and the second content may be the other of the HDR content and the SDR content.

17 Claims, 8 Drawing Sheets

(51) Int. Cl.
*H04N 19/30* (2014.01)
*H04N 19/98* (2014.01)
*H04N 19/463* (2014.01)

(52) U.S. Cl.
CPC .......... *H04N 19/463* (2014.11); *H04N 19/98* (2014.11); *G06T 2207/20208* (2013.01); *G09G 2320/0626* (2013.01); *G09G 2320/0666* (2013.01); *G09G 2320/0673* (2013.01)

(58) Field of Classification Search
CPC ... G09G 2320/0646; G09G 2320/0686; G09G 2320/08; G09G 3/3406; H04N 5/57; H04N 9/7925; H04N 5/2351; H04N 19/98; H04N 21/23418; G06F 3/14
See application file for complete search history.

(56) References Cited

U.S. PATENT DOCUMENTS

| | | |
|---|---|---|
| 10,033,958 B2 | 7/2018 | Terada et al. |
| 2014/0210847 A1 | 7/2014 | Knibbeler et al. |
| 2015/0003749 A1 | 1/2015 | Kim et al. |
| 2015/0042890 A1 | 2/2015 | Messmer |
| 2016/0142714 A1* | 5/2016 | Toma ............... H04N 21/4402 375/240.25 |
| 2016/0155470 A1 | 6/2016 | Toma et al. |
| 2016/0301959 A1 | 10/2016 | Oh et al. |
| 2016/0358584 A1 | 12/2016 | Greenebaum et al. |
| 2017/0034497 A1* | 2/2017 | Yahata ................ G11B 20/10 |
| 2017/0085827 A1 | 3/2017 | Terada et al. |
| 2017/0085833 A1 | 3/2017 | Toma et al. |
| 2017/0237932 A1 | 8/2017 | Terada et al. |
| 2017/0237933 A1 | 8/2017 | Terada et al. |
| 2017/0237934 A1 | 8/2017 | Terada et al. |
| 2018/0213265 A1* | 7/2018 | Toma ............... H04N 21/23418 |

FOREIGN PATENT DOCUMENTS

| | | |
|---|---|---|
| KR | 1020150002440 A | 1/2015 |
| KR | 101579831 B1 | 12/2015 |
| KR | 1020160051791 A | 5/2016 |
| WO | 2015/190044 A1 | 12/2015 |
| WO | 2015/190045 A1 | 12/2015 |
| WO | 2016096562 A1 | 6/2016 |
| WO | 2016/124942 A1 | 8/2016 |

OTHER PUBLICATIONS

Written Opinion (PCT/ISA/237) dated Jun. 25, 2018 issued by the International Searching Authority in International Application No. PCT/KR2018/002814.
Ultra HD Forum, "Ultra HD Forum: Phase A Guidelines", Jul. 15, 2016, Revision: 1.1, DVB, Digital Video Broadcasting, XP017851763. (64 pages total).
Francois, Edouard et al., "Suggested new draft text of Signalling, Backward Compatibility and Display Adaptation for HDR/WCG Video Coding", Joint Collaborative Team on Video Coding (JCT-VC) of ITU-T SG 16 WP 3 and ISO/IEC JTC 1/SC 29/WG 11, 26th Meeting, Geneva, CH, Jan. 12, 2017-Jan. 20, 2017, Document: JCTVC-Z0023. (31 pages total).
EBU Operating Eurovision, "Digital Video Broadcasting (DVB); Specification for the use of Video and Audio Coding in Broadcasting Applications based on the MPEG-2 Transport Stream", DVB Digital Video Broadcasting, Oct. 25, 2016, XP017851425. (278 pages total).
Drugeon, Virginie, "UHD phase 2 and Next Generation Audio in TS 101 154", v2.3.1, Oct. 24, 2016, XP017852151. (29 pages total).
Reznik, Yuriy et al., "CICPs for signaling HDR video properties and their use in DASH", International Organization for Standardization, ISO/IEC JTC1/SC29/WG11, MPEG2017/M39389, Mar. 15, 2017, Chengdu, China, XP017852151. (6 pages total).
Communication dated Nov. 13, 2019 by the European Patent Office in counterpart European Patent Application No. 18764929.8.

* cited by examiner

| BROADCAST | SDR | SDR | SDR | HDR | HDR | .... | HDR |
|---|---|---|---|---|---|---|---|
| BRIGHTNESS | 50 | 50 | 50 | 55 | 60 | .... | 100 |
| FRAME | 1 | 2 | 3 | 4 | 5 | .... | 10 |

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2017-0029866, filed on Mar. 9, 2017 in the Korean Intellectual Property Office, the disclosure of which is incorporated herein by reference in its entirety.

BACKGROUND

1. Field

The disclosure relates to a display apparatus and a control method thereof, and more particularly relates to a display apparatus capable of displaying high dynamic range (HDR) content and a control method thereof.

2. Description of Related Art

With the development of electronic technology, various types of electronic apparatuses have been developed and distributed, and a display technique to improve a color gamut rate has been developed to provide a user with the effect as if a user is looking at actual scenery.

As a method to achieve such a visual effect, a display apparatus that may generate and display HDR content has been developed. The HDR technique is a technique of displaying a more natural appearing image by distinguishing light and shade in a way that is more similar to that of the human eyes. The content generated by a conventional technique is referred to as standard dynamic range (SDR) content. However, in a situation where a display apparatus changes from displaying HDR content to SDR content, and vice versa, the setting of the display suddenly changes, and the transition is perceptible to a user, thereby inhibiting a user experience (e.g., by creating an awkward and sudden transition).

In the situation where content is provided from an existing external input device connected via High-Definition Multimedia Interface (HDMI), and/or the like, or where content stored in a display apparatus is displayed, one of HDR content or SDR content may be changed to the other type according to a user selection. In this case, a user may anticipate that the settings of a display apparatus may change as the content is changed in response to the user selection.

However, if the content is streamed and displayed, a user may not anticipate that the settings of a display apparatus may change in response to the type of content being changed. Accordingly, the sudden transition between output setting values associated with the change from HDR content to SDR content, and vice versa, is more perceptible to the user, and may inhibit a user experience.

Accordingly, a technique to reduce the perceptibility when settings of a display apparatus change is provided.

SUMMARY

In accordance with an aspect of the disclosure, a display apparatus which reduces perceptibility of a transition of output setting values when content to be streamed is changed from HDR content to SDR content or from SDR content to HDR content, and a control method thereof are provided.

In accordance with an aspect of the disclosure, a display apparatus may include a display configured to display first content and second content. The display apparatus may include a storage configured to store a first output setting value corresponding to high dynamic range (HDR) content and a second output setting value corresponding to standard dynamic range (SDR) content. The display apparatus may include a communicator configured to receive the first content and the second content. The display apparatus may include a processor configured to, while the first content is streamed through the communicator and displayed based on one of the first output setting value and the second output setting value that corresponds to the first content and in response to the second content being streamed through the communicator, control the display to change one of the first output setting value and the second output setting value to the other in phases and display the second content. The first content may be one of the HDR content and the SDR content, and the second content may be the other of the HDR content and the SDR content.

The processor is further configured to change one of the first output setting value and the second output setting value to the other in phases in a predetermined frame section or for a predetermined period of time.

The processor is further configured to change one of the first output setting value and the second output setting value to the other in phases by a same unit in the predetermined frame section or for the predetermined period of time.

The processor is further configured to determine a number of frames of the predetermined frame section or the predetermined period of time based on a difference between the first output setting value and the second output setting value.

The processor is further configured to identify whether the first content is the HDR content or the SDR content based on at least one of video usability information (VUI) and supplemental enhancement information (SEI) of the content to be streamed.

Each of the first output setting value and the second output setting value includes at least one of a maximum screen brightness, a gamma curve and a color space.

The storage is further configured to store a first maximum screen brightness corresponding to the HDR content and a second maximum screen brightness corresponding to the SDR content, and the processor is further configured to determine a maximum screen brightness to be changed in phases based on the first maximum screen brightness and the second maximum screen brightness and to display the second content based on the determined maximum screen brightness.

The storage is further configured to store information identifying a first gamma curve corresponding to the HDR content, a second gamma curve corresponding to the SDR content and at least one gamma curve for changing the first gamma curve to the second gamma curve in phases, and a first color space corresponding to the HDR content, a second color space corresponding to the SDR content and at least one color space for changing the first color space to the second color space in phases, and the processor is further configured to display the second content based on the stored information.

The HDR content is broadcast content, and the SDR content is advertisement content.

In accordance with another aspect of the disclosure, a control method of a display apparatus is provided in which a first output setting value corresponding to high dynamic range (HDR) content and a second output setting value corresponding to standard dynamic range (SDR) content are stored by the display apparatus, the method comprises displaying first content that is streamed based on one of the first output setting value and the second output setting value corresponding to the first content, and in response to second content being streamed, changing one of the first output setting value and the second output setting value to the other in phases and displaying the second content, wherein the first content is one of the HDR content and the SDR content, and the second content is the other of the HDR content and the SDR content.

The method may include displaying the second content comprises changing one of the first output setting value and the second output setting value to the other in phases in a predetermined frame section or for a predetermined period of time.

The method may include displaying the second content further comprises changing one of the first output setting value and the second output setting value to the other in phases by a same unit in the predetermined frame section or for the predetermined period of time.

The method may include displaying the second content further comprises determining a number of frames of the predetermined frame section or the predetermined period of time based on a difference between the first output setting value and the second output setting value.

The method may include identifying whether the first content is the HDR content or the SDR content based on at least one of video usability information (VUI) and supplemental enhancement information (SEI) of the content to be streamed.

The method may include each of the first output setting value and the second output setting value including at least one of a maximum screen brightness, a gamma curve and a color space.

The method may include the display apparatus being configured to store a first maximum screen brightness corresponding to the HDR content and a second maximum screen brightness corresponding to the SDR content, and wherein displaying the second content further comprises determining a maximum screen brightness to be changed in phases based on the first maximum screen brightness and the second maximum screen brightness and displaying the second content based on the determined maximum screen brightness.

The method may include the display apparatus is configured to store information identifying a first gamma curve corresponding to the HDR content, a second gamma curve corresponding to the SDR content and at least one gamma curve for changing the first gamma curve to the second gamma curve in phases, and a first color space corresponding to the HDR content, a second color space corresponding to the SDR content and at least one color space for changing the first color space to the second color space in phases, and wherein the displaying the second content further comprises displaying the second content based on the stored information.

The method may include the HDR content being broadcast content, and the SDR content being advertisement content.

In accordance with another aspect of the disclosure, a non-transitory computer-readable medium in which one or more instructions for performing an operation method of a display apparatus where a first output setting value corresponding to high dynamic range (HDR) content and a second output setting value corresponding to standard dynamic range (SDR) content are stored is provided, the operation method comprising displaying first content that is streamed based on one of the first output setting value and the second output setting value corresponding to the first content, in response to second content being streamed, changing one of the first output setting value and the second output setting value to the other in phases and displaying the second content, and wherein the first content is one of the HDR content and the SDR content, and the second content is the other of the HDR content and the SDR content.

According to an embodiment of the disclosure, the display apparatus may change an output setting value of a display in phases when one of HDR content or SDR content is changed to the other, thereby reducing a perceptibility of a transition in output setting values, and thereby enhancing a user experience.

DETAILED DESCRIPTION

The embodiments of the present disclosure may be diversely modified. While embodiments are illustrated in the drawings and are described in detail in the detailed description, it should be understood that the present disclosure is not limited to these embodiments, but includes all modifications, equivalents, and substitutions without departing from the scope and spirit of the present disclosure.

Hereinafter, various embodiments will be described in greater detail with reference to the accompanying drawings.

Figure 1A:
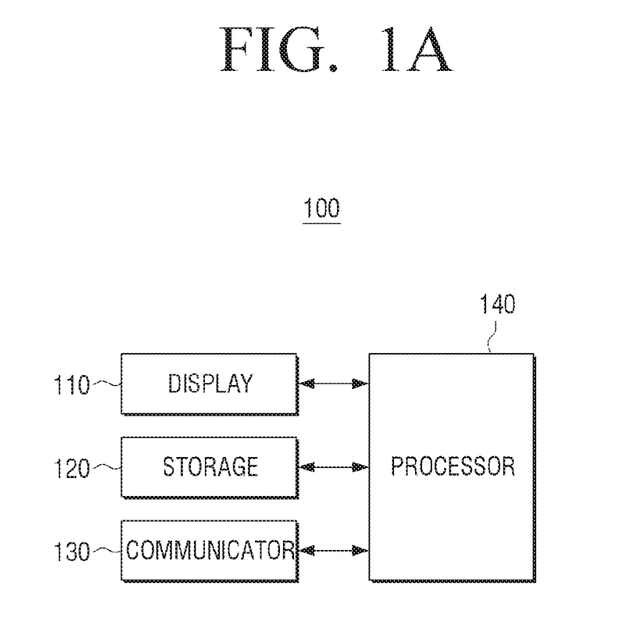
FIG. 1A is a block diagram illustrating an example of a display apparatus according to an embodiment.

FIG. 1A is a block diagram illustrating a display apparatus 100 according to an embodiment. As shown in FIG. 1A, the display apparatus 100 may include a display 110, a storage 120, a communicator 130, and a processor 140.

According to an embodiment, the display apparatus 100 may include one or more display(s) 110, and may be configured to execute an application and to display content. The display apparatus 100 may be, for example, a digital television (TV), a tablet, a personal computer (PC), a portable multimedia player (PMP), a personal digital assistant (PDA), a smartphone, a cell phone, a digital picture frame, a digital signage, a kiosk, a pair of smart glasses, and/or the like.

The display apparatus 100 may display HDR content and SDR content based on a corresponding output setting value for each type of content.

An HDR technique is a technique of displaying a more natural appearing image by distinguishing light and shade in a way that more similar to that of human eyes. The HDR technique may express light and shade more precisely by embodying a brightness up to, for example, 1,000 nit, and accordingly, the HDR may express a dark area more darkly and a bright area more brightly. An SDR technique is a technique of displaying an image while the HDR technique is not applied. The HDR content may refer to content generated by the HDR technique, and the SDR content may refer to content generated by the SDR technique.

When HDR content is streamed, the display apparatus 100 may display the HDR content based on an output setting value corresponding to the HDR content. For example, when the HDR content is streamed, the display apparatus 100 may adjust at least one of a maximum screen brightness, a gamma curve, and/or a color space of the display apparatus 100 to correspond to the HDR content and display the HDR content.

When SDR content is streamed, the display apparatus 100 may display the SDR content based on an output setting value corresponding to the SDR content. Also, when content to be streamed is changed from one of the HDR content or the SDR content to the other, the display apparatus 100 may change an output setting value in phases, as described in more detail elsewhere herein.

Various formats for HDR have been developed, such as Dolby Vision, Technicolor HDR10, Hybrid Log-Gamma 10 (HLG10), etc. The present disclosure is not limited to one of the formats mentioned above, and may be applied to any HDR format and/or subsequently developed HDR format. In the below description, various HDR formats may be referred to as HDR for ease of description. Also, the changing (e.g., transition) from one of HDR content or SDR content to the other may be referred to as changing of a type of content.

The display 110 may display various types of content under control of the processor 140. For example, the display 110 may display HDR content or SDR content. The display 110 may also operate using different output setting values based on a type of content.

The display 110 may be implemented as a liquid crystal display panel (LCD), an organic light emitting diodes (OLED), etc., but is not limited thereto. The display 100 may also be implemented as a flexible display, a transparent display, etc.

The storage 120 may store the first output setting value corresponding to HDR content and the second output setting value corresponding to SDR content. The output setting value may include at least one of a maximum screen brightness, a gamma curve, and/or a color space.

The maximum screen brightness may indicate a maximum screen brightness of the display 110, and may be represented by a nit unit. The gamma curve may refer to an output value compared to a data value of input content, and may be represented as an absolute value or a relative value. In the below description, the gamma curve may be a relative value for ease of description. The color space may refer to an entire range of colors which the display 100 can display.

The storage 120 may further store a value for an output setting value to be changed in phases, as described elsewhere herein. For example, the storage 120 may store the first maximum screen brightness corresponding to HDR content and the second maximum screen brightness corresponding to SDR content, and may further store a predetermined number of screen brightness values between the first maximum screen brightness value and the second maximum screen brightness value.

The storage 120 may further store a plurality of gamma curves and a plurality of color spaces in addition to the first gamma curve and the first color space corresponding to HDR content, and the second gamma curve and the second color space corresponding to SDR content.

The communicator 130 may receive content. For example, the communicator 130 may receive HDR content and SDR content. The content may be received in a form of streamable content. Also, metadata, etc. related to content may be further received.

The communicator 130 may include all devices capable of receiving content in real-time. For example, the display apparatus 100 may receive content via the Internet, and in this case, the communicator 130 may be a local area network (LAN) card provided in the display apparatus 100. The display apparatus 100 may also receive broadcast content via a tuner, and in this case, the communicator 130 may be a tuner provided in the display apparatus 100.

The processor 140 may control overall operations of the display apparatus 100.

The processor 140 may control the display to decode content received in real-time via the communicator 130 and to display the decoded content in real-time. The processor 140 may determine an output setting value of the display 110 corresponding to a type of the received content based on information stored in the storage 120. The processor 140 may display the received content based on the determined output setting value.

For example, if the receive content is HDR content, the processor 140 may display the received content based on the first output setting value corresponding to the HDR content. If the received content is SDR content, the processor 140 may display the received content based on the second output setting value corresponding to the SDR content.

While the streamed first content is displayed based on one of the first output setting value or the second output setting value corresponding to the first content and in response to the second content being streamed, the processor 140 may control the display 100 to change one of the first output setting value or the second output setting value to the other in phases and to display the second content. The first content may be one of the HDR content or the SDR content, and the second content may be the other of the HDR content or the SDR content.

For example, while the streamed HDR content is displayed based on the first output setting value corresponding to the HDR content and in response to the SDR content being streamed, the processor 140 may change the first output setting value to the second output setting value in phases and display the SDR content.

Also, while a streamed SDR content is displayed based on the second output setting value corresponding to the SDR content and in response to an HDR content being streamed, the processor 140 may change the second output setting value to the first output setting value in phases and display the HDR content.

The processor 140 may change at least one of a maximum screen brightness, a gamma curve, and/or a color space in phases as an output setting value.

The HDR content may be broadcast content, and the SDR content may be advertisement content, but are not limited thereto. The HDR content may be advertisement content and the SDR content may be broadcast content. Also, both of the HDR content and the SDR content may be broadcast content or may be advertisement content. It should be understood that the HDR content and/or the SDR content may be any type of content that is capable of being provided for display.

The processor 140 may change one of the first output setting value or the second output setting value to the other in phases in a predetermined frame section or for a predetermined period of time.

The processor 140 may determine the number of frames of the predetermined frame section or the predetermined period of time based on a difference between the first output setting value and the second output setting value.

For example, if the first maximum screen brightness value is 1,000 nit, and the second maximum screen brightness value is 100 nit, the processor 140 may divide the difference value of 900 (e.g., 1000 nit minus 100 nit) by 10 and change a maximum screen brightness in phases through 90 frames (e.g., 900÷10). However, the embodiments are not limited to the above example, and the processor 140 may determine the number of frames of the predetermined frame section or the predetermined period of time by different methods.

The processor 140 may change one of the first output setting value or the second output setting value to the other in the predetermined frame section or for the predetermined period of time in phases by a same unit.

For example, the processor 140 may change a maximum screen brightness in phases from 1,000 nit to 990 nit, 980 nit, 970 nit, . . . 120 nit, 110 nit, and 100 nit through 90 frames.

However, the example embodiments are not limited to the above example. The processor 140 may change the output setting value by different methods. For example, the processor 140 may change the output setting value exponentially.

The processor 140 may identify whether content to be streamed is HDR content or SDR content based on one of video usability information (VUI) and/or supplemental enhancement information (SEI) of the content to be streamed. The VUI and the SEI may be received with the content as metadata.

However, the embodiments are not limited to the above example. The content to be streamed may be identified by any method and/or information which can identify a type of the content to be streamed. For example, the processor 140 may determine the type of content to be streamed based on a size of the content to be streamed. For example, if the content to be streamed is 8 bits, then the processor 140 may determine that the content is SDR content, and if the content to be streamed is 10 bits, then the processor may determine that the content is HDR content.

The storage 120 may store the first maximum screen brightness corresponding to the HDR content and the second maximum screen brightness corresponding to the SDR content, and the processor 140 may determine a maximum screen brightness to be changed in phases based on the first maximum screen brightness and the second maximum screen brightness, and display the second content based on the determined maximum screen brightness.

As an example, the storage 120 may store the first maximum screen brightness, which is, for example, 100 nit, and the second maximum screen brightness, which is 1,000 nit, and the processor 140 may generate a maximum screen brightness to be changed in phases based on 100 nit and 1,000 nit, which are the first maximum screen brightness and the second maximum screen brightness.

In this case, the storage 120 may store only the first maximum screen brightness and the second maximum screen brightness unlike other embodiments using a gamma curve and/or a color space which will be described below.

The storage 120 may store a first gamma curve corresponding to the HDR content, a second gamma curve corresponding to the SDR content and at least one gamma curve for changing the first gamma curve to the second gamma curve in phases, and a first color space corresponding to the HDR content, a second color space corresponding to the SDR content and at least one color space for changing the first color space to the second color space in phases, and the processor 140 may display the second content based on the stored information.

For example, the storage 120 may further store any number of additional gamma curves in addition to the first gamma curve and the second gamma curve, and the processor 140 may use the additional gamma curves to change a gamma curve in phases. Also, the storage 120 may further store any number of additional color spaces in addition to the first color space and the second color space, and the processor 140 may use the additional color spaces to change a color space in phases.

In contrast to the aforementioned embodiment of a maximum screen brightness, the storage 120 may further store at least one gamma curve in addition to the first gamma curve and the second gamma curve, and further store at least one color space in addition to the first color space and the second color space. Also, the processor 140 may use the stored data, and may not generate a gamma curve or a color space to be changed in phases.

However, the embodiments are not limited to the above examples. The processor 140 may generate a gamma curve or a color space to be changed in phases. Also, the storage 120 may store at least one maximum screen brightness to be changed in phases, and the processor 140 may use the stored data.

Figure 1B:
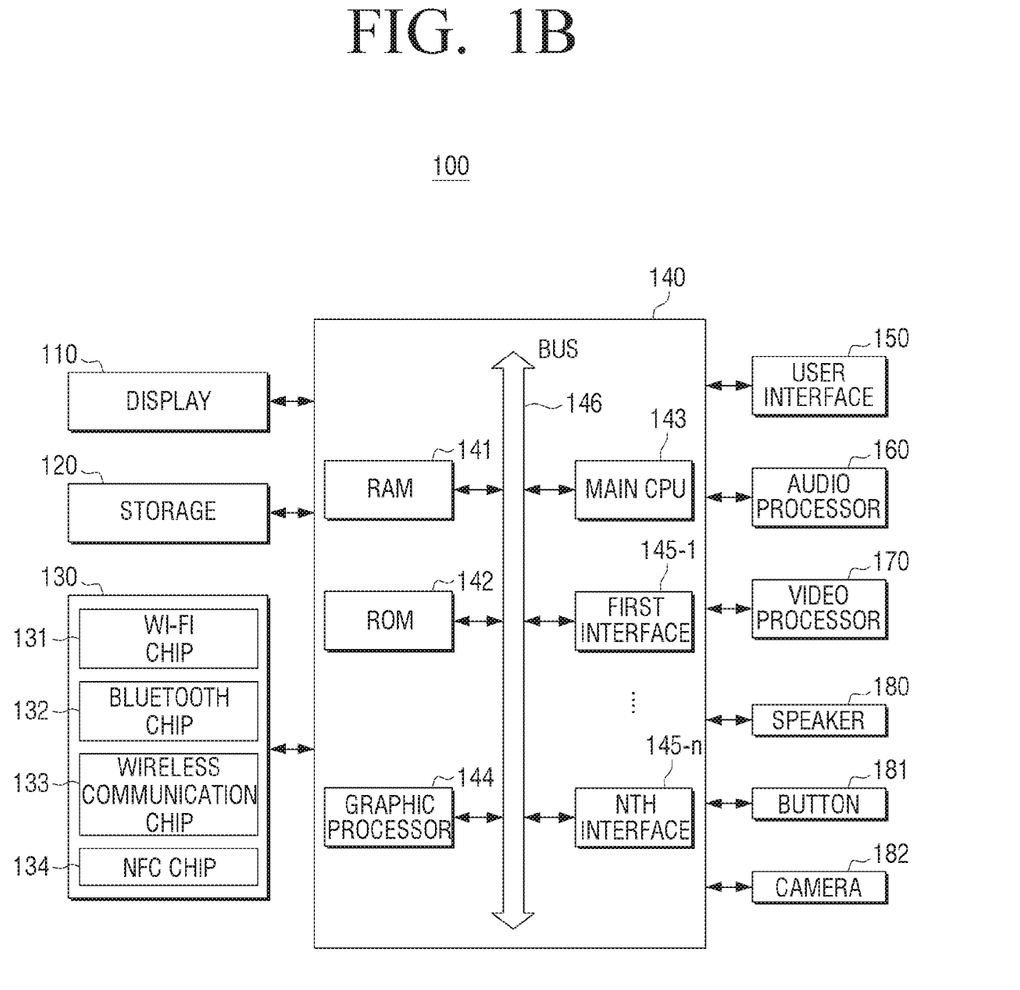
FIG. 1B is a block diagram illustrating an example configuration of a display apparatus.

FIG. 1B is a block diagram illustrating an example configuration of the display apparatus 100 according to an embodiment. As shown in FIG. 1B, the display apparatus 100 may include the display 110, the storage 120, the communicator 130, the processor 140, a user interface 150, an audio processor 160, a video processor 170, a speaker 180, a button 181, and a camera 182.

The processor 140 may control overall operations of the display apparatus 100 using various programs stored in the storage 120. For example, the processor 140 may execute software (e.g., the program) containing one or more instructions that are stored in a computer-readable medium or external memory.

The processor 140 may include a random-access memory (RAM) 141, a read-only (ROM) 142, a main central processing unit (CPU) 143, a graphic processor 144, a first interface 145-1 through an nth interface **145-*n* (e.g., where n≥1), and a bus 146**.

The RAM 141, the ROM 142, the main CPU 143, the graphic processor 144, the first interface 145-1, and the nth interface **145-*n* may communicate with one another via the bus 146**.

The first interface 145-1 through the nth interface **145-*n*** may be connected with the various elements described above. One of the interfaces may be a network interface which is connected with an external apparatus via a network (e.g., the Internet, a LAN, a wide area network (WAN), a metropolitan area network (MAN), a radio access network (RAN), and/or the like).

The main CPU 143 may have access to the storage 120 and perform booting using an operating system (OS) stored in the storage 120, and perform various operations using a variety of programs stored in the storage 120.

In the ROM 142, a command word set, etc. for booting a system may be stored. Once a turn-on command is input and power is supplied, the main CPU 143 may copy the OS stored in the storage 120 to the RAM 141 in response to a command word stored in the ROM 142, and boot the system by executing the OS. Once the booting is completed, the main CPU 143 may copy various application programs stored in the storage 120 to the RAM 141, and perform various operations by executing the application program copied to the RAM 141.

The graphic processor 144 may generate a screen which includes various objects such as an icon, an image, text, etc. using a calculation unit (not illustrated) and a rendering unit (not illustrated). The calculation unit may calculate an attribute value such as a coordinate value, a shape, a size, a color, etc. with which each object is displayed conforming to the layout of the screen based on a received control command. The rendering unit may generate a screen of a variety of layouts which includes an object based on the attribute value calculated by the calculation unit. The screen generated in the rendering unit (not illustrated) may be displayed on a display area of the display 110.

The operations of the processor 140 described above may be performed by a program stored in the storage 120.

The storage 120 may store various data for operating the display apparatus 100, such as an OS software module, an output setting module of the display 110, etc.

In this case, the processor 140 may process and display an input image based on the information stored in the storage 120.

The communicator 130 may communicate with various types of external apparatuses using a variety of communication methods, standards, and/or protocols. The communicator 130 may include a Wi-Fi chip 131, a Bluetooth chip 132, a wireless communication chip 133, a near-field communication (NFC) chip 134, etc. The processor 140 may communicate with various external apparatuses using the communicator 130.

The Wi-Fi chip 131 and the Bluetooth chip 132 may perform communication by Wi-Fi and Bluetooth, respectively. In the case of using the Wi-Fi chip 131 or the Bluetooth chip 132, connection information such as a service set identifier (SSID) and a session key, etc. may be transmitted and received preferentially, communication may be connected using the information, and various information may be transmitted and received. The wireless communication chip 133 may refer to a chip that performs communication in accordance with various communication standards and/or protocols, such as an Institute of Electrical and Electronics Engineers (IEEE) standard, Zigbee, 3rd Generation (3G), 3rd Generation Partnership Project (3GPP), Long Term Evolution (LTE), fifth generation (5G), etc. The NFC chip 134 may refer to a chip that operates using an NFC method which uses a 13.56 megahertz (MHz) band from among various radio-frequency identification (RFID) frequency bands, such as 135 kilohertz (kHz), 13.56 MHz, 433 MHz, 860 to 960 MHz, 2.45 gigahertz (GHz), and/or the like.

The communicator 130 may perform unidirectional communication or bidirectional communication with an external apparatus. If the communicator 130 performs unidirectional communication, the communicator 130 may receive a signal from an external apparatus. When the communicator 130 performs bidirectional communication, the communicator 130 may receive a signal from an external apparatus, or transmit a signal to an external apparatus.

The user interface 150 may receive information associated with various user interactions. The user interface 150 may be implemented in various forms depending on an embodiment of the display apparatus 100. If the display apparatus 100 is implemented as a digital TV, the user interface 150 may be implemented as a remote control signal receiver which receives a remote control signal from a remote control device, a camera which detects a motion of a user, a microphone which receives input associated with a user voice, etc. Also, if the display apparatus 100 is implemented as a touch-based electronic apparatus, the user interface 150 may be implemented as a touch screen forming an inter-layer structure with a touch pad. In this case, the user interface 150 may be used as the display 110 described above.

The audio processor 160 may perform processing of audio data. The audio processor 160 may perform various processing operations such as decoding, amplifying, noise-filtering, etc.

The video processor 170 may perform processing of video data. The video processor 170 may perform various image-processing operations such as decoding, scaling, noise-filtering, a frame rate conversion, a resolution conversion, etc.

The speaker 180 may output various audio data processed in the audio processor 160 and/or various alarm sounds or a voice message, etc.

The button 181 may include various forms of buttons such as a mechanical button, a touch pad, a wheel, etc. which are formed on a an area such as the front surface, the side surface, or the back surface, etc. of the exterior of the main body of the display apparatus 100.

The camera 182 may capture a still image or a video image in accordance with a user control. The camera 182 may be implemented as a plurality of cameras such as a front camera and a rear camera.

As described above, while one of HDR content and/or SDR content is streamed and in response to the other of the HDR content or the SDR content being streamed, the processor 140 may reduce the perceptibility of the transition on a user's viewing by changing an output setting value in phases.

In the below description, the operations of the display apparatus 100 will be described in greater detail with reference to various diagrams.

Figure 2:
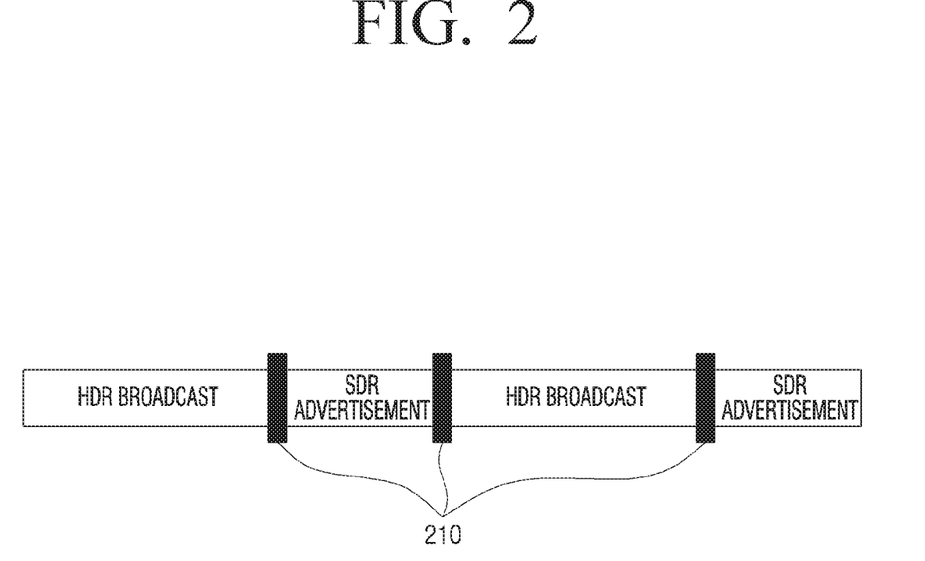
FIG. 2 is a diagram illustrating an example in which a type of streaming content is changed according to an embodiment.

FIG. 2 is a diagram illustrating an example in which a type of streaming content is changed in accordance with an embodiment.

As shown in FIG. 2, the display 100 may receive content in an order of an HDR broadcast, an SDR advertisement, an HDR broadcast, and an SDR advertisement (e.g., shown from left to right in FIG. 2). However, the example embodiments are not limited to the above and the order of receiving content may vary.

The processor 140 may detect that a type of content is changed. For example, the processor 140 may detect that a type of content is changed based on at least one of VUI and/or SEI which are received with the content. The processor 140 may also detect the change of a type of content based on the size of the content (e.g., a number of bits of content).

If the processor 140 determines that a type of content is changed, the processor 140 may change an output setting value of the display 110 in phases in a predetermined frame section or for a predetermined period of time 210.

The processor 140 may determine the number of frames of the predetermined frame section or the predetermined period of time based on a difference between the first output setting value corresponding to the HDR content and the second output setting value corresponding to the SDR content which are stored in the storage 120.

When the number of frames of the predetermined frame section or the predetermined period of time is determined, the processor 140 may change one of the first output setting value or the second output setting value to the other in phases by a same unit.

Figure 3:
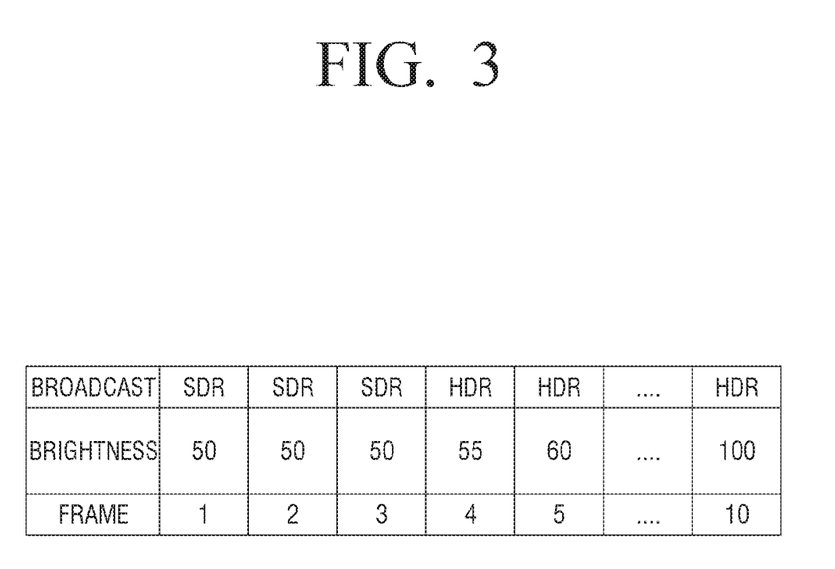
FIG. 3 is a diagram illustrating a method for changing a maximum screen brightness among output setting values according to an embodiment.

FIG. 3 is a diagram illustrating the method for changing a maximum screen brightness value among output setting values. As illustrated in FIG. 3, when an HDR content is streamed while an SDR content is displayed, the processor 140 may change the maximum screen brightness value in phases.

For example, when SDR content is displayed and the processor 140 changes the display from the SDR content to HDR content, the processor 140 may change the maximum screen brightness value in phases from 55 nit, 60 nit, . . . to 100 nit. For example, the processor 140 may change a screen brightness value by a particular unit (e.g., 5 nits) during each phase of the set of phases. In this way, the processor 140 reduces the perceptibility of the transition of the screen brightness value, associated with the transition of the display of SDR content to HDR content, by more gradually transitioning the screen brightness value as compared to a sudden transition.

The processor 140 may calculate the maximum screen brightness value to be changed in phases based on the first maximum screen brightness value and the last maximum screen brightness value. In this case, the storage 120 may store an equation for calculating the maximum screen brightness value to be changed in phases, and the processor 140 may calculate the maximum screen brightness value to be changed in phases based on the first maximum screen brightness value, the last maximum screen brightness value, and the equation.

However, the embodiments are not limited to the above example. The storage 120 may store all the maximum screen brightness values to be changed in phases, and the processor 140 may control the display 110 based on the stored value. In this case, the storage 120 may not store the equation.

FIG. 3 illustrates that the maximum screen brightness value may be changed in phases while HDR content is displayed, but the embodiments are not limited thereto. For example, the processor 140 may change the maximum screen brightness value in phases while SDR content is displayed. The processor 140 may also change the maximum screen brightness value in phases while SDR content and HDR content are displayed.

The maximum screen brightness value may be changed as above due to a difference between the time of streaming of content and the time of displaying content. For example, the processor may require a first time period for processing content after streaming the content, and a second time period for identifying the change of the type of content may be shorter than the first time period. Thus, the processor 140 may change the maximum screen brightness value in phases before displaying the streamed content of which the type is changed.

Such an operation may also be applied to a gamma curve value and/or a color space value instead of and/or in addition to a maximum screen brightness value.

Figure 4:
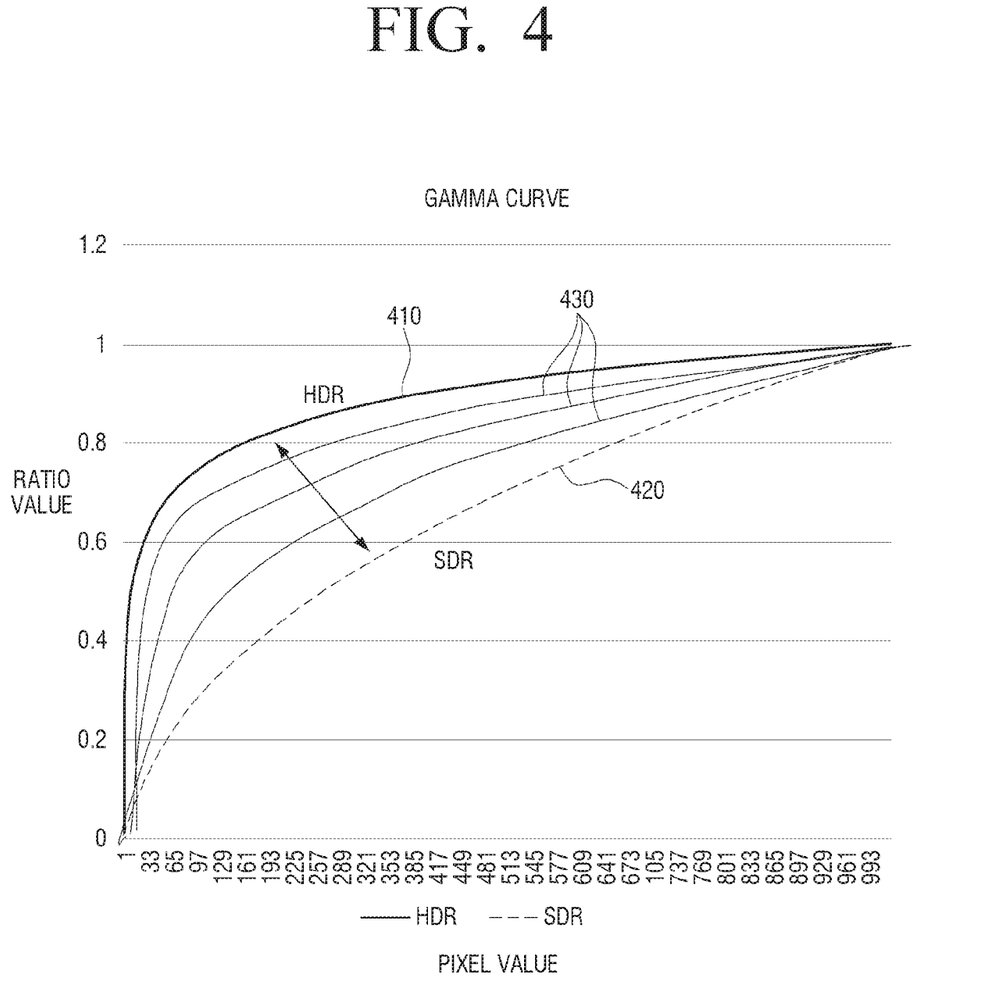
FIG. 4 is a diagram illustrating a method for changing a gamma curve among output setting values according to an embodiment.

FIG. 4 is a diagram illustrating the method for changing a gamma curve among output setting values.

As illustrated in FIG. 4, the storage 120 may store a first gamma curve 410 corresponding to HDR content, a second gamma curve 420 corresponding to SDR content, and at least one or more other gamma curves 430 for changing one of the first gamma curve 410 and/or the second gamma curve 410 to the other in phases, and the processor 140 may change a gamma curve in phases based on the stored information.

FIG. 4 illustrates that the number of the at least one or more gamma curves 430 is three, but is not limited thereto. There may be any different number of gamma curves 430.

The storage 120 may not store the at least one gamma curve 430, and instead store an equation for changing one of the first gamma curve 410 and the second gamma curve 420 to the other. In this case, the processor 140 may calculate a gamma curve to be changed in phases based on the first gamma curve 410, the second gamma curve 420, and the stored equation.

For example, the processor 140 may calculate a ratio value to be changed in phases based on a difference between a same pixel value (e.g., an x-axis value) and a ratio value (e.g., a y-axis value) in the first gamma curve 410 and the second gamma curve 420. In this case, the processor 140 may calculate an entire gamma curve to be changed in phases. Additionally, or alternatively, the processor 140 may also calculate only a ratio value needed for each pixel value when content is displayed.

Also, as described above, the processor 140 may change a gamma curve in phases while at least one of SDR content and/or HDR content is displayed.

Figure 5:
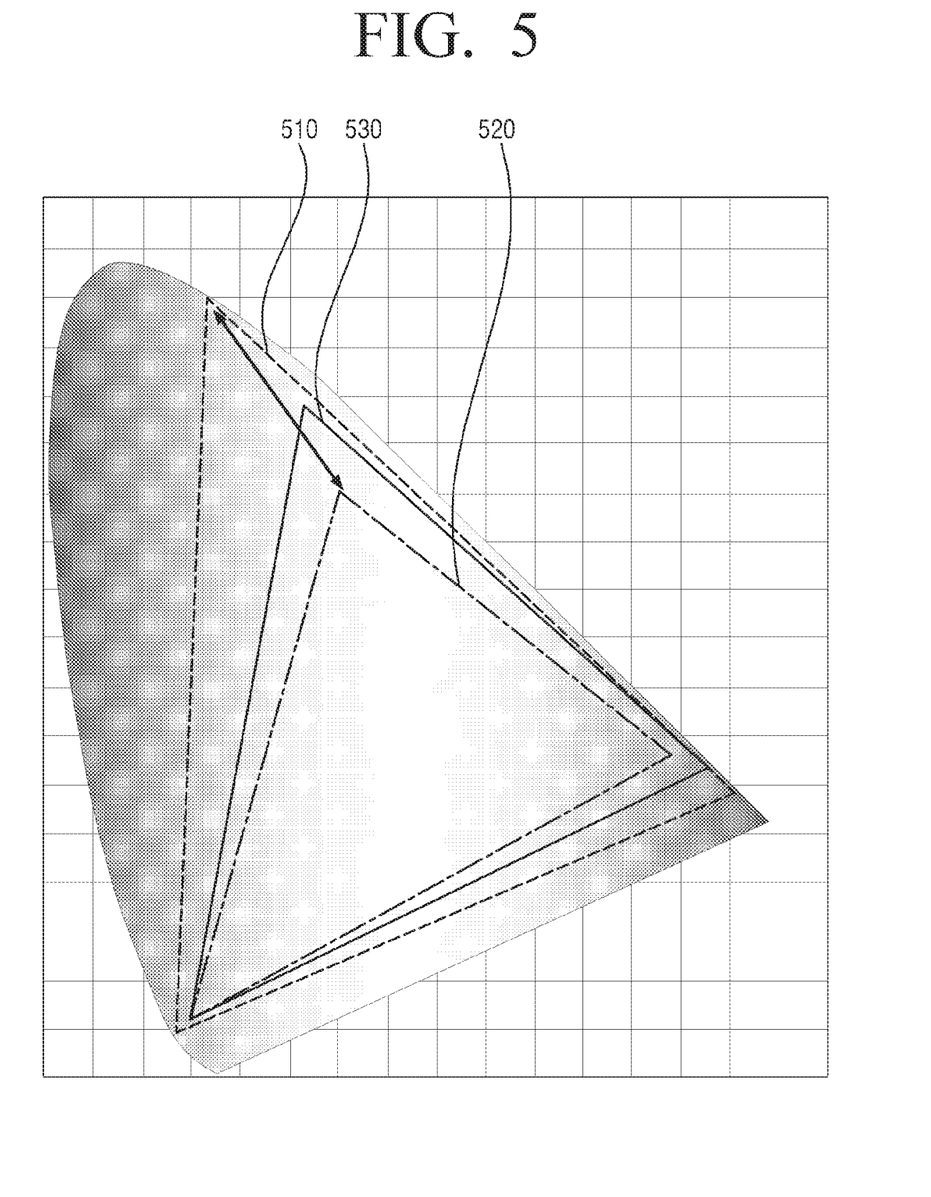
FIG. 5 is a flowchart illustrating a method for changing a color space among output setting values according to an embodiment.

FIG. 5 is a diagram illustrating the method for changing a color space among output setting values according to an embodiment.

As illustrated in FIG. 5, the storage 120 may store the first color space 510 corresponding to HDR content, the second color space 520 corresponding to SDR content, and at least one color space 530 for changing one of the first color space 510 or the second color space 520 to the other in phases, and the processor 140 may change a color space in phases based on the stored information.

FIG. 5 illustrates that the number of the at least one color space 530 may be three, but is not limited thereto. There may be any number of color spaces.

The storage 120 may not store the at least one color space 530, and instead store an equation for changing one of the first color space 510 or the second color space 520 to the other. In this case, the processor 140 may calculate a color space to be changed in phases based on the first color space 510, the second color space 520, and the stored equation.

For example, the processor 140 may connect a pair of corresponding apexes in the first color space 510 and the second color space 520, and calculate a color space to be changed in phases using a triangle proportional expression.

The processor 140 may change a color space in phases while displaying at least one of SDR content and HDR content as described above.

Figure 6:
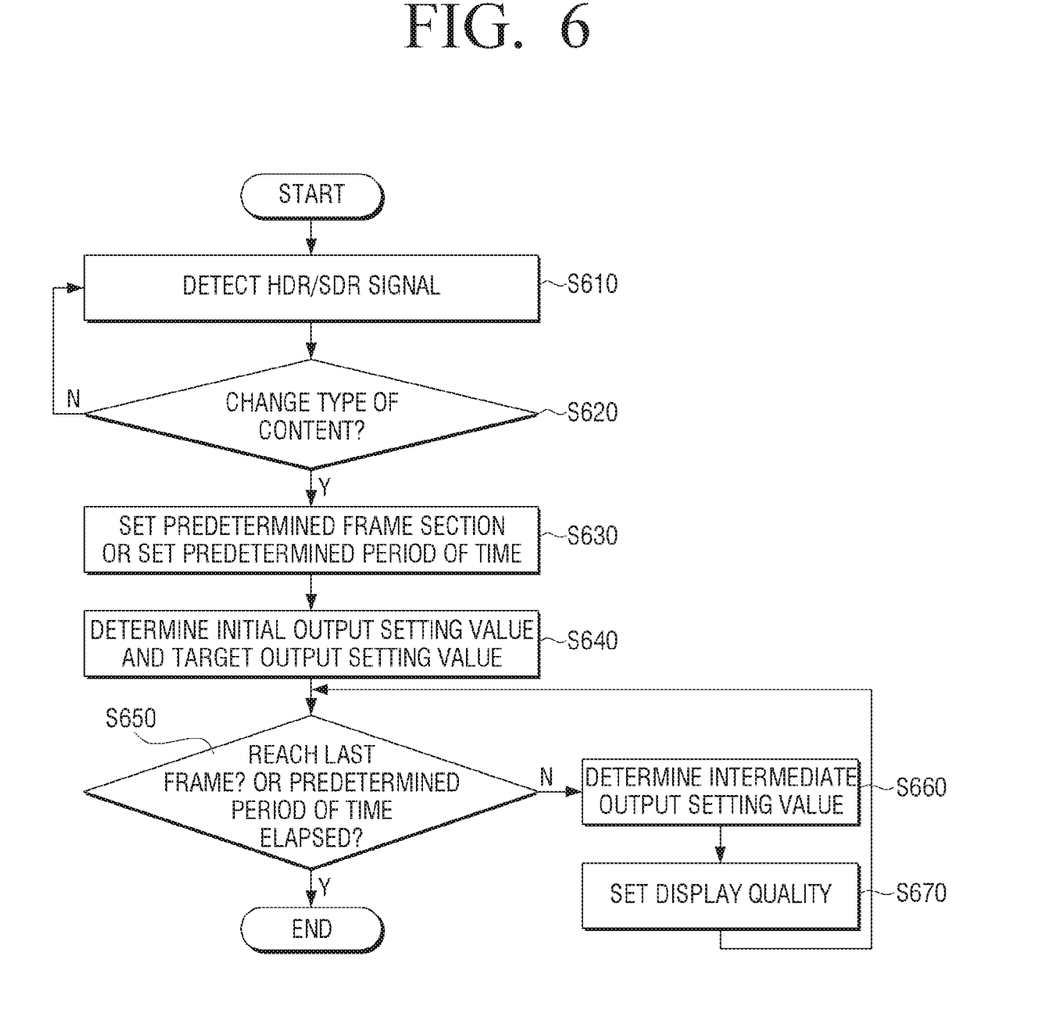
FIG. 6 is a flowchart illustrating a method for determining an intermediate output setting value according to an embodiment.

FIG. 6 is a flowchart illustrating a method for determining an intermediate output setting value in accordance with an embodiment.

According to the method, an HDR/SDR signal may be detected (S610). Whether the detected signal is an HDR or an SDR signal may be identified based on at least one of VUI and SEI. After the determination, whether a type of content is changed may be determined (S620).

If it is determined that a type of content is changed, a predetermined frame section or a predetermined period of time may be set (S630). If a type of content is not changed, the HDR/SDR signal may be detected continuously.

If a predetermined frame section or a predetermined period of time is set, an initial output setting value and a target output setting value may be determined (S640), and it may be determined whether a frame has arrived as a last frame of the predetermined frame section or whether the predetermined period of time has elapsed (S650).

If a frame has not arrived as the last frame of the predetermined frame section, and the predetermined period of time has not elapsed, an intermediate setting value may be determined (S660). The intermediate output setting value may vary depending on a progression time, and a display quality may be set based on the determined intermediate output setting value (S670). If a frame arrives as the last frame (e.g., the last frame is reached) of the predetermined frame section or the predetermined period of time elapses by repeating the above operations, the process of operations may end. In this case, the HDR/SDR signal may be detected again.

Also, the HDR/SDR signal may be detected even before reaching the target output setting value. If a type of content changes again before reaching the target output setting value, the initial output setting value may be determined as an intermediate output setting value of the time point at which a type of content changes. In this case, the set frame section or the predetermined period of time may be changed.

Figure 7:
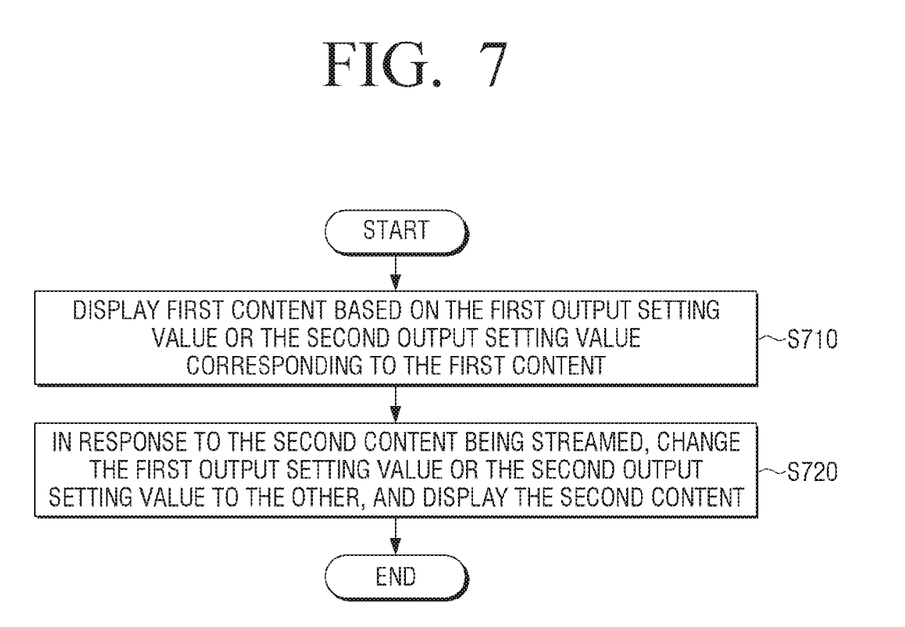
FIG. 7 is a flowchart illustrating a control method of a display apparatus according to an embodiment.

FIG. 7 is a flowchart illustrating a control method of a display apparatus in accordance with an embodiment.

According to the control method of the display apparatus in which the first output setting value corresponding to HDR content and the second output setting value corresponding to SDR content are stored, streamed first content may be displayed based on the first output setting value or the second output setting value corresponding to the first content (S710). In response to the second content being streamed, one of the first output setting value and the second output setting value may be changed to the other in phases, and the second content may be displayed (S720). The first content may be one of HDR content or SDR content, and the second content may be the other of the HDR content or the SDR content.

In the operation of displaying the second content (S720), one of the first output setting value or the second output setting value may be changed to the other in phases in a predetermined frame section or for a predetermined period of time.

The operation of display the second content (S720) may change one of the first output setting value or the second output setting value to the other in phases by a same unit in the predetermined frame section or for the predetermined period of time.

The operation of displaying the second content (S720) may determine the number of the predetermined frames or the predetermined period of time based on a difference between the first output setting value and the second output setting value.

The method may further include determining whether content to be streamed is HDR content or SDR content based on VUI and and/or SEI of the content to be streamed.

Each of the first output setting value and the second output setting value may include at least one of a maximum screen brightness, a gamma curve, and/or a color space.

The display apparatus may store the first maximum screen brightness corresponding to HDR content and the second maximum screen brightness corresponding to SDR content, the operation of displaying the second content (S720) may include determining a maximum screen brightness to be changed in phases based on the first maximum screen brightness and the second maximum screen brightness, and displaying the second content based on the determined maximum screen brightness.

The display apparatus may store a first gamma curve corresponding to the HDR content, a second gamma curve corresponding to the SDR content and at least one gamma curve for changing the first gamma curve to the second gamma curve in phases, and a first color space corresponding to the HDR content, a second color space corresponding to the SDR content and at least one color space for changing the first color space to the second color space in phases, and the operation of displaying the second content (S720) may include displaying the second content based on the stored information.

The HDR content may be broadcast content, and the SDR content may be advertisement content.

According to one or more example embodiments described above, the display apparatus may change an output setting value of a display in phases when one of HDR content or SDR content is changed to the other, thereby reducing the perceptibility of a change in the output setting value during a transition from HDR content to SDR content, and vice versa.

In the above description, it is described that a storage may store the first output setting value corresponding to HDR content and the second output setting value corresponding to SDR content, but the example embodiments are not limited thereto. For example, the storage may further store an output setting value corresponding to a different type of content as well as HDR content and SDR content. In this case, the operations of the processor may be substantially the same as above.

The methods described in one or more example embodiments may be programmed in software and be stored in various storage mediums. Accordingly, the methods described in various example embodiments described above may be implemented in diverse types of electronic apparatuses which execute instructions stored in a storage medium.

As a storage medium, a non-transitory computer readable medium in which a program performing the above methods in sequence is stored may be provided.

A non-transitory computer readable medium may refer to a machine-readable medium or device which stores data semi-permanently, such as a register, a cache, a memory, and/or the like. The aforementioned various applications or programs may be stored in a non-transitory computer readable medium such as a compact disc (CD), a digital versatile disc (DVD), a hard disk, a Blu-ray disc, a universal serial bus (USB) stick, a memory card, a ROM, etc.

The foregoing example embodiments and advantages are merely examples and are not to be construed as limiting the embodiments. The description of the embodiments is intended to be illustrative, and not to limit the scope of the inventive concept, as defined by the appended claims, and many alternatives, modifications, and variations will be apparent to those skilled in the art.

What is claimed is:

1. A display apparatus comprising:
   a display;
   a storage;
   a communicator; and
   a processor configured to:
      in response to a second content being streamed through the communicator while a first content streamed through the communicator is displayed based on a first output setting value corresponding to a type of the first content, identify a set of intermediate output setting values based on the first output setting value and a second output setting value corresponding to a type of the second content, control the display to display a first part of the second content using the set of intermediate output setting values, the set of intermediate output setting values corresponding to a plurality of phases between the first output setting value and the second output setting value, and control the display to display a second part of the second content using the second output setting value;

wherein the first content is one of high dynamic range (HDR) content and standard dynamic range (SDR) content, and the second content is the other of the HDR content and the SDR content, and wherein the processor is further configured to change one of the first output setting value and the second output setting value to the other in the plurality of phases in a predetermined frame section or for a predetermined period of time.

2. The display apparatus according to claim 1, wherein the processor is further configured to change one of the first output setting value and the second output setting value to the other in the plurality of phases by a same unit in the predetermined frame section or for the predetermined period of time.

3. The display apparatus according to claim 1, wherein the processor is further configured to determine a number of frames of the predetermined frame section or the predetermined period of time based on a difference between the first output setting value and the second output setting value.

4. The display apparatus according to claim 1, wherein the processor is further configured to identify whether the first content is the HDR content or the SDR content based on at least one of video usability information (VUI) and supplemental enhancement information (SEI) of the content to be streamed.

5. The display apparatus according to claim 1, wherein each of the first output setting value and the second output setting value includes at least one of a maximum screen brightness, a gamma curve and a color space.

6. The display apparatus according to claim 1, wherein the storage is further configured to store a first maximum screen brightness corresponding to the HDR content and a second maximum screen brightness corresponding to the SDR content, and wherein the processor is further configured to determine a maximum screen brightness to be changed in the plurality of phases based on the first maximum screen brightness and the second maximum screen brightness and to display the second content based on the determined maximum screen brightness.

7. The display apparatus according to claim 1, wherein the storage is further configured to store information identifying a first gamma curve corresponding to the HDR content, a second gamma curve corresponding to the SDR content and at least one gamma curve for changing the first gamma curve to the second gamma curve in the plurality of phases, and a first color space corresponding to the HDR content, a second color space corresponding to the SDR content and at least one color space for changing the first color space to the second color space in the plurality of phases, and wherein the processor is further configured to display the second content based on the stored information.

8. The display apparatus according to claim 1, wherein the HDR content is broadcast content, and the SDR content is advertisement content.

9. A control method of a display apparatus, the method comprising:

in response to second content being streamed, displaying first content streamed based on a first output setting value corresponding to a type of the first content;

identifying a set of intermediate output setting values based on the first output setting value and a second output setting value corresponding to a type of the second content;

displaying a first part of the second content using the set of intermediate output setting values, the set of intermediate output setting values corresponding to a plurality of phases between the first output setting value and the second output setting value; and displaying a second part of the second content using the second output setting value;

wherein the first content is one of high dynamic range (HDR) content and standard dynamic range (SDR) content, and the second content is the other of the HDR content and the SDR content, and wherein the displaying the second content comprises changing one of the first output setting value and the second output setting value to the other in the plurality of phases in a predetermined frame section or for a predetermined period of time.

10. The method according to claim 9, wherein the displaying the second content further comprises changing one of the first output setting value and the second output setting value to the other in the plurality of phases by a same unit in the predetermined frame section or for the predetermined period of time.

11. The method according to claim 9, wherein the displaying the second content further comprises determining a number of frames of the predetermined frame section or the predetermined period of time based on a difference between the first output setting value and the second output setting value.

12. The method according to claim 9, further comprising:

identifying whether the first content is the HDR content or the SDR content based on at least one of video usability information (VUI) and supplemental enhancement information (SEI) of the content to be streamed.

13. The method according to claim 9, wherein each of the first output setting value and the second output setting value includes at least one of a maximum screen brightness, a gamma curve and a color space.

14. The method according to claim 9, wherein the display apparatus is configured to store a first maximum screen brightness corresponding to the HDR content and a second maximum screen brightness corresponding to the SDR content, and wherein the displaying the second content further comprises determining a maximum screen brightness to be changed in the plurality of phases based on the first maximum screen brightness and the second maximum screen brightness and displaying the second content based on the determined maximum screen brightness.

15. The method according to claim 9, wherein the display apparatus is configured to store information identifying a first gamma curve corresponding to the HDR content, a second gamma curve corresponding to the SDR content and at least one gamma curve for changing the first gamma curve to the second gamma curve in the plurality of phases, and a first color space corresponding to the HDR content, a second color space corresponding to the SDR content and at least one color space for changing the first color space to the second color space in the plurality of phases, and wherein the displaying the second content further comprises displaying the second content based on the stored information.

16. The method according to claim 9, wherein the HDR content is broadcast content, and the SDR content is advertisement content.

17. A non-transitory computer-readable medium in which one or more instructions for performing an operation method of a display apparatus, the operation method comprising:
- in response to second content being streamed, displaying first content streamed based on a first output setting value corresponding to a type of the first content;
- identifying a set of intermediate output setting values based on the first output setting value and a second output setting value corresponding to a type of the second content;
- displaying a first part of the second content using the set of intermediate output setting values, the set of intermediate output setting values corresponding to a plurality of phases between the first output setting value and the second output setting value, and
- displaying a second part of the second content using the second output setting value;
- wherein the first content is one of high dynamic range (HDR) content and standard dynamic range (SDR) content, and the second content is the other of the HDR content and the SDR content, and
- wherein the displaying the second content comprises changing one of the first output setting value and the second output setting value to the other in the plurality of phases in a predetermined frame section or for a predetermined period of time.

* * * * *